F. W. BURNS.
HOSE COUPLING.
APPLICATION FILED MAR. 15, 1920.
1,384,045.                    Patented July 12, 1921.
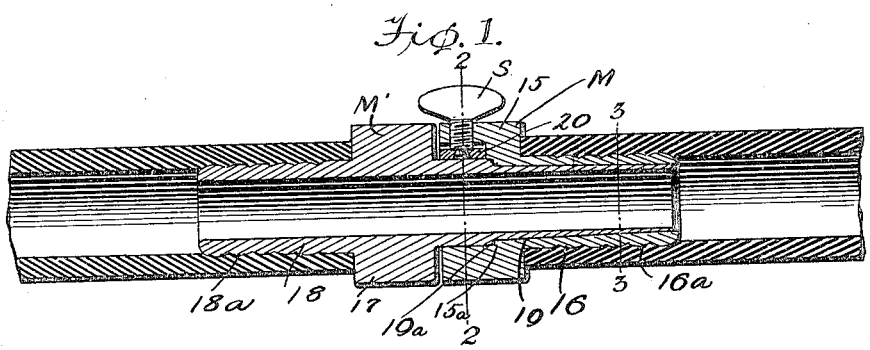
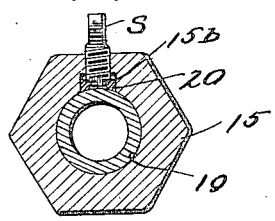   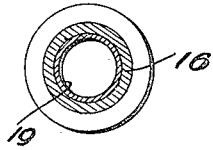
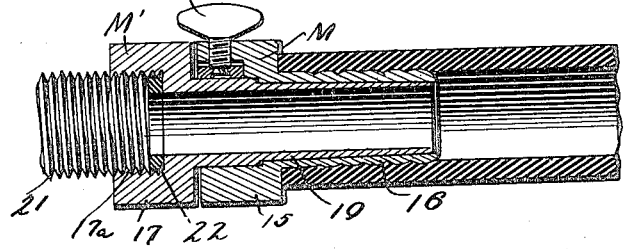
WITNESSES
INVENTOR
F. W. Burns,
BY
ATTORNEYS

UNITED STATES PATENT OFFICE.

FRED WILLIAM BURNS, OF JOHNSTOWN, PENNSYLVANIA.

HOSE-COUPLING.

1,384,045.                Specification of Letters Patent.    Patented July 12, 1921.

Application filed March 15, 1920. Serial No. 365,719.

*To all whom it may concern:*

Be it known that I, FRED WILLIAM BURNS, a citizen of the United States, and a resident of Johnstown, in the county of Cambria and State of Pennsylvania, have invented certain new and useful Improvements in Hose-Couplings, of which the following is a specification.

My invention relates to hose couplings, and a purpose of my invention is the provision of a coupling of this character which is of simple and efficient construction and which can be readily attached to or detached from the ends of two sections of hose, and when in applied position to effectively connect the two sections of hose in such manner as to prevent a leakage between the sections.

It is also a purpose of my invention to provide a coupling by means of which a section of hose may be quickly and securely connected to a spigot.

I will describe two forms of couplings embodying my invention and will then point out the novel features thereof in claims.

In the accompanying drawings:

Figure 1 is a view showing in longitudinal section one form of hose coupling embodying my invention in applied position at the meeting ends of two sections of hose.

Fig. 2 is a transverse sectional view taken on the line 2—2 of Fig. 1.

Fig. 3 is a view similar to Fig. 2 taken on the line 3—3 of Fig. 1.

Fig. 4 is a longitudinal sectional view of a modified form of coupling embodying my invention.

Similar reference characters refer to similar parts in each of the several views.

Referring specifically to the drawings and particularly to Figs. 1, 2 and 3, M designates generally a female member comprising a circular head 15 from one side of which extends a tubular portion 16 that is corrugated on its outer surface as at 16ᵃ so that when inserted into the end of a hose section, such corrugations will serve to maintain the member as a unit within the section.

M' designates a male member comprising a head 17 having a tubular portion 18 extending from one side thereof and corrugated on its outer surface as at 18ᵃ for retaining the same within another hose section. Extending from the opposite side of the head 17 is a tubular portion 19 which is adapted to extend through the head 15 and into the tubular portion 16. The tubular portion 19 is provided with a shoulder 19ᵃ which is adapted to engage a shoulder 15ᵃ formed in the head 15 whereby, the inward movement of the male member within the female member is defined. As clearly illustrated in Fig. 1, the tubular portion 16 is provided with a tapering bore, while the portion 19 is tapered in width and reversely with respect to the tapering of the bore of the portion 16 so that when the portion 19 is inserted into the portion 16 a snug fitting of the two members will be secured so as to prevent the passage of liquid between the two.

The male member M' is locked within the female member M by a set screw S which extends through a suitable opening formed in the head 15 and into a recess 15ᵇ provided in such head as clearly shown in Fig. 2. The inner end of the set screw S carries a head 20 which is curved on its inner face to conform to the curvature of the tubular portion 19. By this arrangement it will be clear that when the screw S is fed inwardly, the head 26 is caused to engage the portion 19 and to thereby securely lock the two members together. It will be understood that because of the taper of the portions 16 and 19, the two members will also be frictionally held together. However, they may be readily separated by inserting a suitable tool between the heads 15 and 17 when it is desired to disconnect the two hose sections.

From the foregoing construction it will be manifest that a liquid-tight coupling is provided and without the employment of washers, gaskets and the like as an effective liquid seal is provided between the male and female members by virtue of the formation of the portions 16 and 19.

Referring now to Fig. 4 I have here shown a female member M which is identical in construction to the female member of the coupling shown in Fig. 1. In this embodiment of my invention, the male member M' is identical in construction to the male member M' of the coupling shown in Fig. 1 with the exception that it is not provided with a tubular portion 18. In the present instance, the head 17 is interiorly threaded as at 17ᵃ to receive the threaded nozzle 21 of a conventional form of spigot (not shown).

To prevent leakage between the head 17 and the nozzle 21, a washer 22 is interposed between the two in the manner shown.

In this form of my invention it will be understood that the male member M' is first applied to the nozzle 21, whereupon the female member M is placed upon the portion 19 and locked thereon by means of the set screw S.

Although I have herein shown and described only two forms of couplings embodying my invention, it is to be understood that various changes and modifications may be made herein without departing from the spirit of the invention or the spirit and scope of the appended claims.

What I claim is:

1. A hose coupling comprising, a female member including a head and a tubular portion having a tapering bore, a male member including a head, a tubular portion adapted to be inserted into the tubular portion of the female member, and a second tubular portion adapted to be inserted into a hose, and means carried by the head of the female member and engageable with the first tubular portion of the male member for locking the two members together.

2. A hose coupling comprising a female member including a head and a tubular portion, a male member including a head, a tapered tubular portion adapted to be inserted into the tubular portion of the female member, a second tubular portion adapted to be inserted into a hose, a head movable within the head of the female member, and a set screw for actuating said head to cause the same to engage the male member for locking the two members together.

3. A hose coupling comprising a female member, including a recessed head having an internal shoulder, a tubular portion extending from one side of said head and having a tapering bore, a locking head mounted in said recess, a set screw threadedly mounted in said head and operatively connected to said locking head, a male member including a head and a tapered tubular portion extending from one side of said head and having a shoulder engageable with the shoulder of the female head.

FRED WILLIAM BURNS.